United States Patent [19]

Cohen

[11] Patent Number: 4,928,828
[45] Date of Patent: May 29, 1990

[54] SNAP ACTION STORAGE HOLDER FOR COMPUTER DISKETTES

[75] Inventor: Jay B. Cohen, Philadelphia, Pa.

[73] Assignee: Cobar, Inc., Cheltenham, Pa.

[21] Appl. No.: 418,746

[22] Filed: Oct. 4, 1989

Related U.S. Application Data

[63] Continuation of Ser. No. 103,871, Oct. 2, 1987, abandoned.

[51] Int. Cl.⁵ .............................................. B65D 85/30
[52] U.S. Cl. .................................... 206/444; 206/311; 206/454; 206/456; 206/472
[58] Field of Search ............... 206/307, 311, 387, 444, 206/449, 450, 454–456, 472, 555

[56] References Cited

U.S. PATENT DOCUMENTS

| | | | |
|---|---|---|---|
| 2,968,882 | 1/1961 | Ozeki | 206/456 X |
| 3,593,845 | 7/1971 | Schwartz | 206/387 |
| 3,604,556 | 9/1971 | Schwartz | 206/387 |
| 3,797,147 | 3/1974 | Lemberg | 206/472 X |
| 4,202,122 | 5/1980 | Namiki | 206/456 X |
| 4,207,980 | 6/1980 | Namiki | 206/456 |
| 4,236,635 | 12/1950 | Namiki | 206/456 |
| 4,425,997 | 1/1984 | Grant | 206/456 X |
| 4,427,727 | 1/1984 | Ozeki | 206/456 X |
| 4,533,049 | 8/1985 | Ozeki | 206/455 |
| 4,676,374 | 6/1987 | Wilkins | 206/444 |
| 4,691,826 | 9/1987 | Ozeki | 206/456 |
| 4,724,956 | 2/1988 | Ozeki | 206/456 X |
| 4,860,897 | 8/1989 | Fowler et al. | 206/444 |

OTHER PUBLICATIONS

See attachment "A" to Information Disclosure Statement Accomedia, No. 50407–flexible vinyl holder.

*Primary Examiner*—Bryon Gehman
*Attorney, Agent, or Firm*—Robert C. Podwil

[57] ABSTRACT

A storage holder for computer diskettes includes a page-like member of a size corresponding generally to that of a loose-leaf page and adapted to be used with a binder of the loose-leaf type. The page-like member provides recesses for receiving diskettes, access to which is through openings dimensioned to correspond with the dimensions of the diskettes. Engagement of the diskettes with the recesses is positive and by snap action, to prevent the diskettes from inadvertently falling from the holder regardless of the holder's position and orientation.

5 Claims, 2 Drawing Sheets

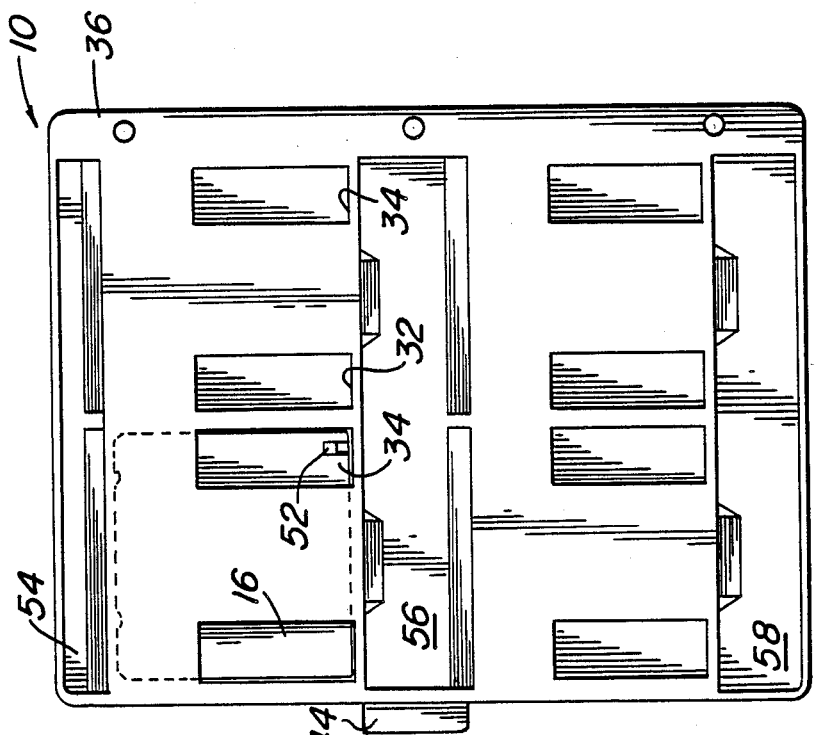
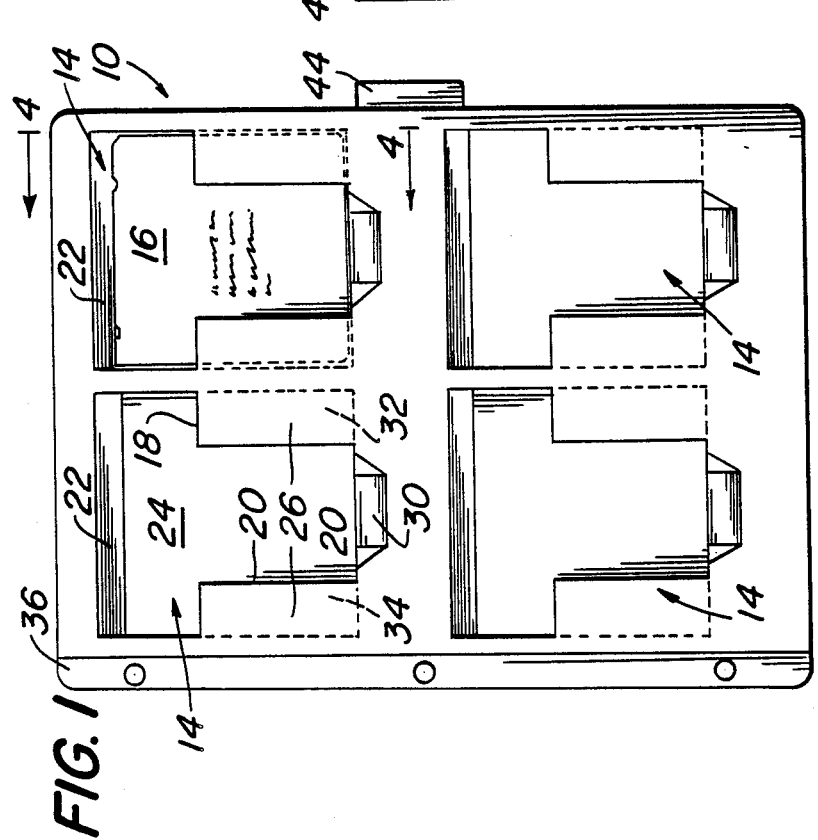

SNAP ACTION STORAGE HOLDER FOR COMPUTER DISKETTES

This is a continuation of Ser. No. 103,871, filed Oct., 2, 1987, now abandoned.

BACKGROUND OF THE INVENTION

Programs for computers are embodied in electronic media such as semiconductor chips, or stored in magnetic media such as tape, flexible (so called "floppy") disks or "hard" disks. For microcomputers, the kinds of devices most often used for personal computing in home, school and office settings, disks are provided and used in diskettes, assemblies of a disk-shaped plastic substrate coated with a metallic oxide medium capable of retaining a magnetically deposited message (the actual "disk"), and a surrounding sleeve or jacket within which the disk can be rotated ("driven"). The sleeve or jacket typically has a central opening through which a drive mechanism may contact the disk to rotate it, and access openings through which a magnetic head may contact the disk to "write" on or erase from it.

Diskettes are notoriously fragile, and their fragility reflects itself in the reliability of the systems in which they are used. Rough handling, particularly bending, can affect their magnetic coatings and interfere with the critical mechanical and magnetic interactions among the disk, sleeve, disk drive mechanism and magnetic head(s). An important consideration, therefore, in storing disks, is minimizing the potential for physical damage.

This invention is directed to apparatus for storing diskettes, and more particularly, for holding diskettes in a secure manner and protecting them from undue wear and tear. The present invention allows substantial numbers of diskettes to be stored in a compact, space efficient way using inexpensive and easily handled loose leaf binders. Another aspect of the present invention is the positive mechanical interaction between the stored diskettes and their holder, so that the diskettes are prevented from accidentally falling from the holder regardless of the position of the holder.

SUMMARY OF THE INVENTION

In general, the invention is embodied, in its presently preferred form, in a semi-rigid plastic page-like member, which has in it plural protective recesses, each recess adapted to receive and retain a single diskette. Each recess is a partial enclosure, access to which is provided in the presently preferred embodiment by a generally "T"-shaped slot. Walls of the recess and a resilient flap portion associated with the slot engage the diskette and securely retain it within the slot, frictionally and by snap action. The page-like member may be kept, with others like it, in a loose leaf binder for ease of storage and access. In the presently contemplated form of the invention, the page-like member is formed, using injection molding, stamping or other suitable forming techniques, from a suitable structural plastic such as polypropylene, high density polyethylene, styrene or other suitable material.

There is seen in the drawings a form of the invention which is presently preferred (and which represents the best mode contemplated for carrying the invention into effect), but it should be understood that the invention is not limited to the precise arrangements and instrumentalities shown or described.

BRIEF DESCRIPTION OF THE DRAWINGS

FIG. 1 is a front elevation view of a holder in accordance with the invention;

FIG. 2 is a rear elevation view of a holder in accordance with the invention;

FIG. 3 is an end elevation view of a holder in accordance with the invention;

DESCRIPTION OF PREFERRED EMBODIMENT

Figure 4:
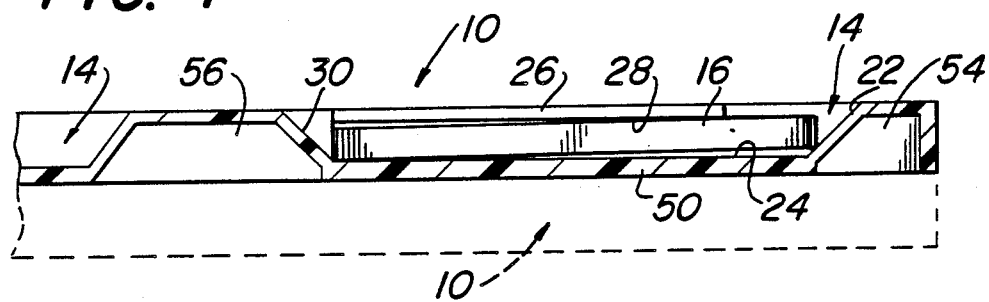
FIG. 4 is a partial cross sectional view, taken along this line 3—3 in FIG. 1.

Referring now to the drawings in detail, wherein like reference numerals indicate like elements, there is seen in FIG. 1 a holder for diskettes, designated generally by the reference numeral 10. As is best in FIG. 4, several holders 10 may be mounted in a loose leaf binder 12.

The holder 10 is semi-rigid in the sense that it is self-supporting, not drapable or easily bent, although, as is explained below, parts of it are deformable under hand pressure in its intended use.

Each holder 10 contains plural protective recesses or enclosures, designated generally by the reference numeral 14, for diskettes, one of which is seen in FIG. 1 and designated by the reference numeral 16. In the configuration shown in FIG. 1, the dimensions of the holder 10 are approximately 8 ¼ inches by 11 inches (that is, "letter"-sized) and the recesses 14 are sized to receive four "floppy" diskettes of the conventional 3½" size. Such diskettes are relatively rigid, a property which facilitates their snap engagement with the recesses 14, as will be described below. It is within the purview of the invention to store in holders of the type described diskettes of other types and sizes.

Referring now to FIGS. 1 and 4, the recesses 14 in the presently preferred embodiment have a generally T-shaped external configuration, defined by an enlarged entrance portion 18, the width of which corresponds generally to and slightly exceeds the width the diskette 16. The recess 14 further includes, in the illustrated embodiment, an open slot portion 20 disposed generally at right angles to the entrance portion 18. A ramp portion 22 associated with the entrance portion 18 facilitates engagement of a diskette 16 with the recess 14. The open configuration of the slot portion 20 makes visible and accessible for writing on the label conventionally associated with diskettes such as the diskette 16. Slots approximately 3" wide allow for the desired visibility and accessibility.

The recess 14 has a bottom wall portion 24, and the configuration of the entrance portion 18 and open slot portion 20 is such as to define a pair of flaps 26, interior faces 28 of which (best seen in FIGS. 4 and 4A) face and are spaced from the bottom wall portion 24 of the recess 14. A recessed slot 30, extending at an oblique angle to the bottom wall portion 24 and opening into the open slot portion 20, serves as an extension of the open slot portion 20 for a purpose to be described shortly.

Referring now to FIG. 2, areas of the bottom wall portion 24 directly opposed to the interior faces 28 of the flaps 26 are relieved and open, so as to provide perforations 32 and 34 through the bottom wall portion 24.

The holder 10 is provided with an edge mounted flange 36, in which holes 38, 40 and 42 are placed, to facilitate engagement of the holder 10 with the rings of the loose-leaf binder 12. A tab 44, associated with the edge of the holder 10 opposite from the edge on which the flange 36 is located, facilitates manipulation of the holder 10 within the binder 12. The tabs 44 on various holders of a set may be staggered in their positions along the edge of the holders 10, to facilitate selection.

Figure 4A:
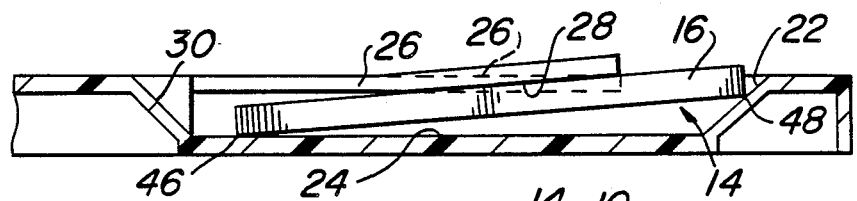
FIG. 4A is a view like that of FIG. 3, showing a portion of the holder as a diskette is mounted into or removed from a recess in the holder.
Figure 5:
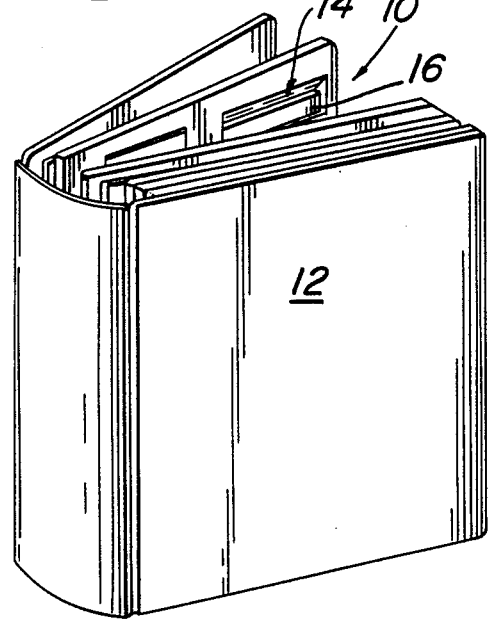
FIG. 5 is a pictorial view, illustrating the manner in which holders in accordance with the invention may be associated with a loose leaf binder.

FIGS. 4 and 4A illustrate the manner in which a diskette 16 is frictionally and by "snap" action retained in the recess 14. Referring first to FIG. 4A, the diskette 16 is shown in a transitional position, during insertion or removal from the recess 14. As can be seen, one corner edge 46 of the diskette 16 is well within the recess 14, and in contact with the bottom wall portion 24. Another corner edge 48 rests on the ramp portion 22 associated with the entrance portion 18 of the recess 14. With the diskette 16 so positioned, the flaps 26 are resiliently deflected as depicted in the full line portion of FIG. 4A from their undeflected, rest position, depicted by dotted lines in that figure. Resilient deflection of the flaps 26 results in a positive frictional engagement with the diskette 16 and a slight, friction induced resistance to movement of the diskette 16 in or out of the recess 14. Referring now to FIG. 4, the diskette 16 is seen in its rest position within the recess 14. The force imparted to the upper surface (i.e. face) of the diskette 16 by the interior face 28 of the flap 26 provides a "snap" action as the diskette 16 approaches its rest position within the recess 14, and positively maintains the diskette 16 within the recess 14. When it is desired to remove the diskette 16 from the recess 14, the diskette 16 may be ejected by inserting a finger into the recessed slot 30 and applying force on the diskette 16 in the direction of the entrance portion 18 of the slot 14. The corner edge 48 will then tend to ride up the ramp portion 22, and the transmission of force between the upper face of the diskette 16 and interior face 28 of the flap 26 will cause the flap 26 to deflect sufficiently to enable the diskette 16 to be withdrawn or ejected from the recess 14.

Referring to FIG. 4, there is seen in dotted lines a holder 10' abutting the holder 10. When in a loose leaf binder 12, adjacent holders 10 in accordance with the invention can abut each other in face to back relationship, so that surface portions, such as the lower surface portion 50 of the holder 10 in FIG. 4, tend to abut adjacent holders such as the holder 10' and further prevent inadvertent separation of diskettes 16 from the recesses of the adjacent holder 10'. This beneficial feature of the holder 10 may best be exploited by judiciously selecting the number of holders 10 for use in a given binder 12. For example, in one presently preferred form of the invention, four holders 10, when kept within a 1" binder 12 will naturally abut in face-to-back relationship, thus maximizing the securing effect of abutment of the holders 10.

Referring to FIG. 2, the perforations 32, 34 of the holders 10 have an incidental benefit of permitting inspection of diskettes 16 kept in the holders. Thus, in FIG. 2, the position of a copy-protect button 52 associated with the diskette 16 may be observed through a perforation 34.

Referring again to FIG. 4, certain structural details of a presently preferred form of the holder 10 are shown. The holder 10, may be formed, as indicated above, using well known techniques as injection molding, blow molding or stamping. In its presently preferred form, the holder 10 is injection molded from high density polyethylene, a material which provides a desired degree of impact resistance and resilience, enabling the flaps 26 to function in the above-described manner. As indicated above, other suitable materials may be used. Suitable recesses, webs and ribs may be provided, as desired, to provide structural rigidity and a pleasing appearance. The material may be colored as desired, and color coding of holders to signify the nature of the diskettes intended to be associated with them is feasible.

Referring to FIG. 2, the molded configuration of the holder 10 provides recesses or relieved portions 54, 56 and 58, so that in cross section, the holder 10 provides a sinuous configuration of small wall thickness. Other specific configurations may be used, but the illustrated embodiment facilitates abutment of the lower surface portion 50 with the recess of an adjacent holder 10' for the purpose mentioned above.

The present invention may be embodied in other specific forms without departing from its spirit or essential attributes. Accordingly, reference should be made to the appended claims, rather than the foregoing specification and the drawings, as indications of the scope of the invention.

I claim:

1. For use in a binder of the loose-leaf type, an insert for holding and protecting computer diskettes and the like, comprising:

a page-like member having therein a plurality of recesses adapted to receive diskettes, said recesses being defined by respective side and end walls extending across said recesses, one of said end walls providing a ramp portion to facilitate insertion of a diskette into the recess, said diskettes having respective first and second faces, access to said recesses being provided through slots defined by an entrance portion having a width in excess of the width of a diskette and an open slot portion intersecting said entrance portion and extending generally perpendicularly thereto, said slots being generally T-shaped, said entrance portion defining the top of the "T" and said open slot portion defining the stem of the "T", the width of said open slot portions being sufficient to facilitate entry of a diskette into said recesses, said ramp portion being associated with said entrance portion and juxtaposed to said flap portions, said ramp portion and said flap portions cooperating to provide a snap action to retain diskettes in said recesses, said ramp portion and said flap portions partly closing said recesses and adapted to engage diskettes received in said recesses, said flap portions being disposed on opposite sides of said open slot portion so as to partly overly lateral edges of a diskette received in a recess, said flap portions being resiliently displaceable to provide said snap action to facilitate entry of diskettes into said recesses and to frictionally engage the first faces of the diskettes when diskettes are disposed in said recesses to thereby retain said diskettes in said recesses, said recesses having bottom wall portions, the second faces of the diskettes abuttable with said bottom wall portions when diskettes are disposed in said recesses, said page-like member being made of plastic polymeric material and having a sinuous cross-section defining said recesses and flap portions, said flap portions having surfaces flush with and in part defining one face of said page-like member, said one face being the uppermost surface of said member and said bottom wall portions of said recesses being flush with and having surfaces in part defining the other face of said page-like member, said other face of said page-like member being the lowermost surface of said member, the respective faces of said member being substantially flat and adapted to conform to and abut with respective faces of an adjacent page-like member when a plurality of such members are disposed in a loose-leaf binder, said bottom wall portions of said recesses being juxtaposed to and covering open slot portions of an adjacent member to aid in retaining diskettes in said recesses when said page-like members are disposed in a binder.

2. An insert in accordance with claim 1, wherein said open slot portion is sufficiently wide to facilitate writing on the label of a diskette received in a recess.

3. An insert in accordance with claim 2, and openings in said bottom wall portions of said recesses, said openings providing access to said recesses through said bottom wall portions.

4. An insert in accordance with claim 1, and a plurality of marginal openings in said page-like member, said openings adapting said insert to be retained in a loose-leaf binder.

5. An insert in accordance with claim 4, and a tab member disposed on an edge of said page-like member to facilitate manipulation of said holder when said holder is disposed in a loose-leaf binder.

* * * * *